United States Patent [19]

Davis

[11] Patent Number: 4,886,238

[45] Date of Patent: Dec. 12, 1989

[54] APPARATUS FOR MOLDING FOOTWEAR

[76] Inventor: John M. Davis, Avenida Universidad, Apt. 3B, Ponce, P.R., 00731

[21] Appl. No.: 160,300

[22] Filed: Feb. 25, 1988

[51] Int. Cl.$^4$ ............................................. A43D 65/00
[52] U.S. Cl. ........................................ 249/83; 249/107; 264/244; 425/119; 425/129.2
[58] Field of Search ................ 264/244, 261; 249/107, 249/160, 83; 425/119, 129.2, 573

[56] References Cited

U.S. PATENT DOCUMENTS

| | | | |
|---|---|---|---|
| 3,026,575 | 3/1962 | Lusher et al. | 264/261 |
| 3,319,301 | 5/1967 | Ludwig | 264/244 |
| 3,555,609 | 1/1971 | Chu et al. | 264/244 |
| 3,670,070 | 6/1972 | Appleton | 264/244 |
| 4,296,053 | 10/1981 | Doerer et al. | 264/DIG. 60 |
| 4,302,416 | 11/1981 | Rudolf et al. | 425/119 |

Primary Examiner—Jan H. Silbaugh
Assistant Examiner—Allan R. Kuhns
Attorney, Agent, or Firm—Scrivener and Clarke

[57] ABSTRACT

Apparatus and method for injecting molten plastics material into a midsole cavity by the provision of channels entirely within at least one-half of a split side mold defining sides of the cavity. This arrangement eliminates the problems associated with injecting the molten plastics along a channel formed in the parting line between the side mold halves and particularly overcomes the problem of injecting molten plastics material incorporating a blowing agent to provide closed cells in the midsole.

4 Claims, 2 Drawing Sheets

APPARATUS FOR MOLDING FOOTWEAR

This invention relates to molding apparatus and method for use in the manufacture of footwear, and more particularly to apparatus and method for molding a midsole of molten flexible plastics material, such as polyvinyl chloride, hereafter "PVC", to a preformed outsole and to an upper.

Heretofore it has been known to injection mold a midsole into a ring mold composed of a pair of mold halves which are moved into abutment along a central parting line conforming substantially to the longitudinal axis of the sole. The ring mold is open, top and bottom, with the bottom being closed by a mold plate carrying a preformed sole of solid, that is to say, non-cellular, flexible plastic material, usually PVC. The top is closed by the bottom of a last having releasably attached thereto an upper whose lower edge extends into the mold cavity vertically spaced above the outsole by a distance defined by the vertical side walls of the mold halves. Heretofore there was machined or otherwise formed along each mold half at the parting line at least at one end thereof, one half of a gating channel such that when the two mold halves were moved into abutment with each other along the parting line, a cylindrical gating channel was formed leading from one end of the two mold halves into the mold cavity defined by the last, sole plate and vertical side walls of the ring molds. When molten non-cellular plastic was injected into this split passage, it entered the mold cavity to complete the midsole and connect the upper with the outsole. However, a midsole of non-cellular PVC, say, when combined with the non-cellular outsole made an extremely heavy shoe and because the life of the shoe is not determined by the midsole but only by the outsole, a heavy non-cellular midsole not only served no useful purpose, so far as the durability of the shoe was concerned, but, because of its weight detracted from the salability of the shoe. In order to lighten the shoe, therefore, a plurality of spikes were added to the lower surface of the last to provide voids in the midsole, the voids being covered by an insert. Though this lightened the shoe, it created other problems, one being the difficulty of stripping the completed shoe from the spiked last. Further, the insert had to bridge the voids and this added back some weight and also increased expense. Thus, some segments of the industry adapted a system of adding a so-called blowing agent to the molten plastics, the blowing agent, in the correct proportions, foaming to add throughout the molten plastics material gas-filled voids or cells and this proved a most satisfactory solution to the problem of lightening footwear.

However, injecting molten plastics material containing a blowing agent into a midsole mold cavity produced a number of additional problems such as forcing the mold halves apart at the parting line so that the material escaped without filling the mold. The only apparent solution to that problem was to inject the molten blown plastics material into the split gating channel at sufficiently low speed and low pressure that the molten material, as it expanded in the channel, did not force the mold halves apart. The problem with this solution was that at low injection rate and pressure not only was production slowed but the molten material would often solidify, before the cavity was completely filled, and block the further flow of material into the cavity. After considering the problem at length and in accordance with the present invention, it was determined that the foregoing problems could be eliminated if, instead of injecting the material through the joined passage halves at the parting line, a main gating channel is formed entirely in at least one of the mold halves with branch runner channels, formed also entirely in that half, leading from the main channel into the midsole mold cavity at longitudinally spaced intervals through the mold side wall. In order to permit the ready removal of the resulting sprue remaining in the channels after injection, all of the channels are tapered in the direction of plastics flow towards the cavity, with the runner channels also slanting in the direction of plastic flow from the main channel to the mold side wall. An outward pull on the tail of the sprue at the entrance of the main channel permits the easy withdrawal of the interconnected sprues from all of the channels.

With the channel arrangement just described, any problem with injecting molten blown plastic material into a midsole cavity has disappeared and high speed production is now permissible at high injection rates and at high pressure. Further, volumetric control of the compounds is vastly improved and densities can be controlled to close tolerances. Adhesions are improved and are consistent around the periphery of the shoe and leakage along the parting line is eliminated.

Thus the object of the invention is to provide an improved apparatus and method for injecting molten plastics material into the midsole cavity of a split ring mold.

More particularly it is an object of the invention to provide a method and apparatus which permits the injection of blown molten plastics material into a midsole mold cavity with substantially no limitation on the speed or pressure with which the material can be injected.

Other objects and their attendant advantages will become apparent as the following detailed description is read in conjuction with the accompanying drawings wherein.

Figure 1:
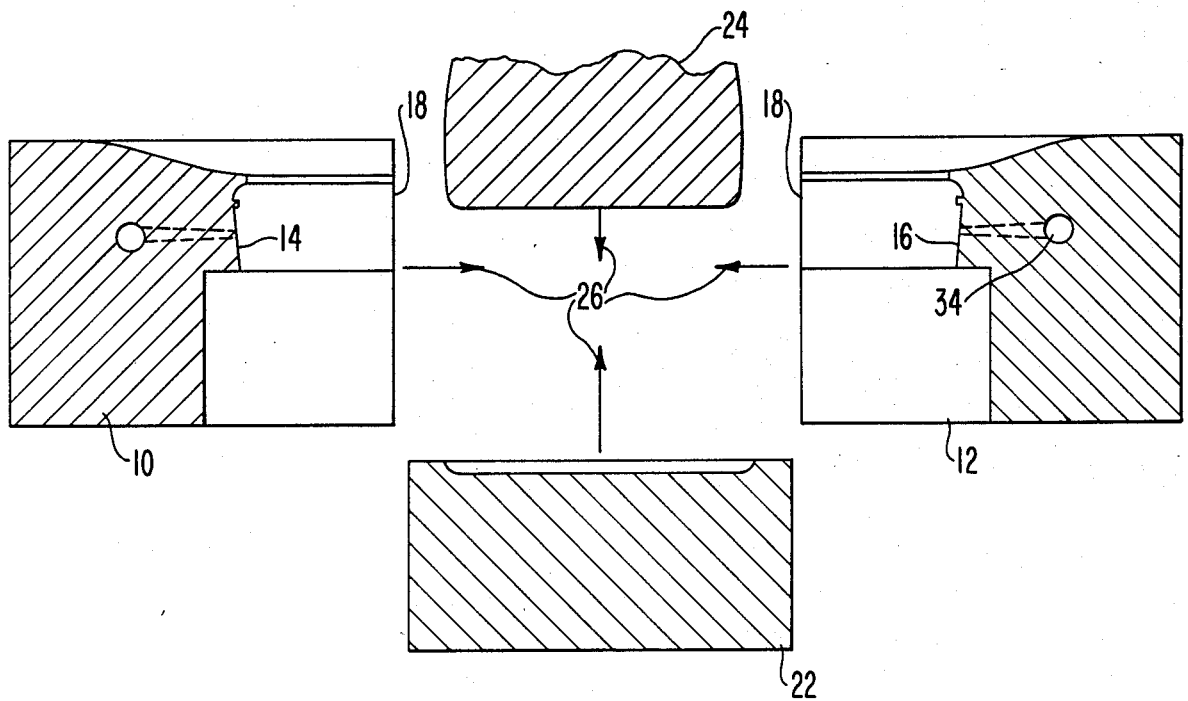
FIG. 1 is a somewhat schematic, vertical cross-sectional view of mold components in their open position.
Figure 2:
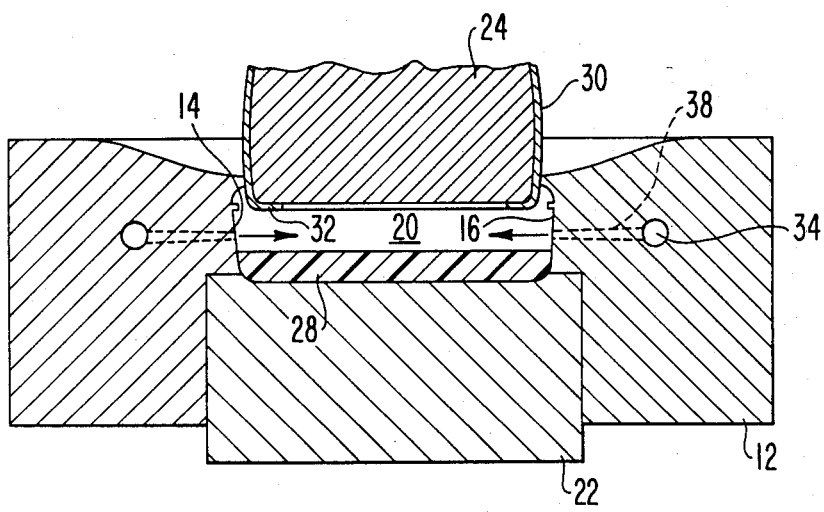
FIG. 2 is a vertical cross-sectional view of the components of FIG. 1 in their closed, molding positions.
Figure 3:
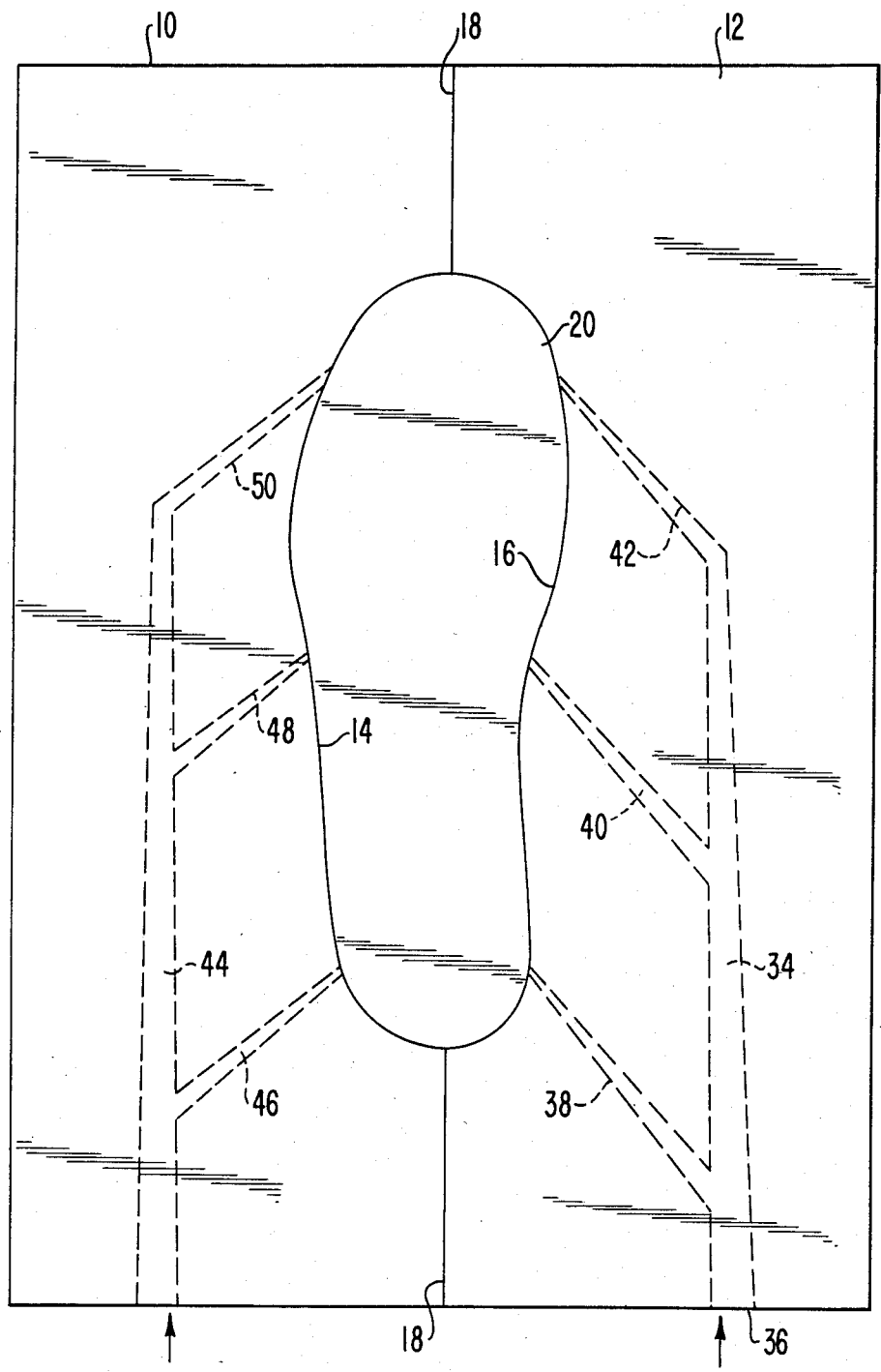
FIG. 3 is a top plan view of two side mold halves in their closed position.

Referring now to the drawings, a mold for molding flexible plastics material, which may be thermoplastic or thermosetting and is often polyvinyl chloride, comprises a pair of side mold members 10, 12 each having a vertical wall 14, 16 respectively, defining one-half of a midsole mold cavity on the respective opposite sides of a parting line 18 which when the mold is closed, conforms substantially to the longitudinal axis of the insole, as can be seen in FIG. 3. The vertical walls 14, 16 of the respective side mold members 10, 12, when abutting each other along the parting line 18, define a peripherally closed ring mold cavity 20 open at its top and bottom. A sole plate 22 closes the bottom of the cavity and a last 24 closes the top of the cavity. Means, represented by the arrows 26 in FIG. 1 and well known in the art of computer controlled automatic shoe molding machinery move the mold halves 10, 12 from the spaced apart position of FIG. 1 into an abutting position along the parting line 18, the sole plate 22 with a preformed outsole 28 therein into a position closing the bottom of the mold cavity 20 and the last 24 with an upper 30 releasably fixed thereto into a position vertically spaced from said outsole 28 and closing the top of the cavity, with the lower edge 32 of the upper 30 projecting into the cavity 20 as is clear in FIG. 2.

What has been described so far is conventional and heretofore molten plastics material had been injected into the mold cavity through a cylindrical gating passage defined by a pair of semi-cylindrical grooves, one in each mold half at the parting line 18, the grooves, when the mold halves were in abutment along the parting line defining a cylindrical gating channel leading from one end of the closed mold halves into the mold cavity 20. Though this arrangement was satisfactory for injecting molten plastics material which did not include a blowing agent, by which is meant a foaming material to provide cells or voids in the midsole to lighten the same, when a mixture of molten plastics material, say, PVC, and a foaming or blowing agent were injected through the cylindrical passage defined by the mating semi-cylindrical grooves in the parting line, the foaming agent swelled and the resulting force, added to the already high injection pressure, was often sufficient to drive the mold halves apart and permit the molten plastics material to escape along the parting line without filling the cavity 20.

In accordance with the invention, the problems associated with injecting blown molten plastics material into the mold through the split gating channel is solved by forming a main gating channel 34 entirely within at least one of the mold halves 10 or 12, with one end 36 of the channel opening to the exterior of the mold half to define entrance into the passage. Runner channel means such as the channels 38, 40 and 42 are also formed entirely within the mold half and interconnect the main gating passage 34 with the vertical wall 16 of the mold half.

Preferably, the main gating channel is substantially parallel to the parting line 18 and, as shown in FIG. 3, extends along a substantial length of the mold cavity with the branch runner channel or channels slanting from the main channel 34 to the side wall 16 of the mold half 12. All of the channels are tapered, as shown, in the direction of plastics flow in order that, after injection and setting, the flexible solidified sprue can be easily withdrawn from the channels by the slight pull of known automatic sprue extracting means (not shown) which grasps the end of the sprue extending outwardly of the entrance 36.

The method of the invention comprises molding a midsole in a mold cavity as defined above and includes the steps of forming entirely within at least one of the halves of the side mold members, say member 12, the main gating channel 36 leading from the exterior of the mold half into the half, and branch runner channel means, such as anyone or all of branch runner channels 38, 40, 42, interconnecting the main channel and the vertical wall of the mold half. Thereafter molten plastics material is injected into the main gating channel to fill through the branch runner channels the space between the mold halves, the last 24 and sole plate 22. In addition, the method includes the step of adding to the molten plastics material a blowing agent prior to injection of the molten plastics material into the mold cavity via the main gating and branch runner channels.

The drawings show a second main gating channel 44 and runner channel 46-48 in the other mold half 10. Having two substantially identical sets of channels is within the purview of the invention though, in practice, a single set has performed satisfactorily. The invention is susceptible of use with any type of plastics material either thermosetting or thermoplastic, it being particularly suitable for molding midsoles of blown polyvinyl chloride.

Having now described the invention, I claim:

1. In a mold for molding a midsole of molten flexible plastics material to a preformed outsole and an upper comprising a pair of side mold members each having a vertical wall defining one-half of a midsole mold cavity on the respective opposite sides of a parting line which, when the mold is closed conforms substantially to the longitudinal axis of said midsole, the vertical walls of said side mold members when the latter abut each other along said parting line defining a peripherally closed ring mold cavity open at its top and bottom, a sole plate for closing the bottom of said cavity and a last for closing the top of said cavity; means for substantially simultaneously moving said side mold halves from a spaced apart position into an abutting position along said parting line, said sole plate with a preformed outsole thereon into a position closing the bottom of said ring mold cavity, and said last with an upper releasably fixed thereto into a position vertically spaced from said preformed outsole and closing the top of said ring mold cavity with the lower edge of said upper projecting into said ring mold cavity; the improvement comprising means for conveying injected molten plastics material into said ring mold cavity between said last and said sole plate comprising a main gating channel formed entirely within one of said mold halves and extending substantially parallel to said parting line along a substantial length of said mold cavity with one end of said channel opening to the exterior of said mold half for the reception of injected molten plastics material, and branch runner channel means also formed entirely within said one mold half and interconnecting said main gating channel with the vertical wall of said mold half.

2. In the mold of claim 1, wherein said branch runner channel means comprises at least one runner channel slanting from said main gating channel to said side wall in the direction of plastics flow in said main gating channel.

3. In the mold of claim 2, wherein said main gating channel and said runner channel means taper in the direction of plastics flow.

4. In the mold of claim 1, wherein said branch runner channel means comprises a plurality of branch runner channels each slanting from said main gating channel to said side wall of said mold half in the direction of plastics flow in said main gating channel.

* * * * *